United States Patent
Urban et al.

(10) Patent No.: US 12,070,672 B2
(45) Date of Patent: Aug. 27, 2024

(54) PORTABLE PHYSICAL AND OCCUPATIONAL THERAPY SYSTEMS AND METHODS

(71) Applicants: Angela Rene Urban, Colorado Springs, CO (US); Meredith Urban Hartl, Pleasanton, TX (US); Michael Larry Urban, Colorado Springs, CO (US); Darrell Wayne Hartl, Pleasanton, TX (US)

(72) Inventors: Angela Rene Urban, Colorado Springs, CO (US); Meredith Urban Hartl, Pleasanton, TX (US); Michael Larry Urban, Colorado Springs, CO (US); Darrell Wayne Hartl, Pleasanton, TX (US)

( * ) Notice: Subject to any disclaimer, the term of this patent is extended or adjusted under 35 U.S.C. 154(b) by 932 days.

(21) Appl. No.: 15/850,425

(22) Filed: Dec. 21, 2017

(65) Prior Publication Data

US 2019/0192949 A1    Jun. 27, 2019

(51) Int. Cl.
*A63B 71/02* (2006.01)
*A63B 71/00* (2006.01)
*G09B 19/00* (2006.01)

(52) U.S. Cl.
CPC ........ *A63B 71/023* (2013.01); *A63B 71/0009* (2013.01); *G09B 19/003* (2013.01);
(Continued)

(58) Field of Classification Search
CPC ............. A63B 71/0009; A63B 71/023; A63B 2209/00; A63B 2022/0092;
(Continued)

(56) References Cited

U.S. PATENT DOCUMENTS

| 3,419,272 A | 12/1968 | Miller et al. |
| 4,485,585 A | 12/1984 | Shackelford et al. |

(Continued)

OTHER PUBLICATIONS

"PVC Backdrop/Light Stand," U. Tirosh, https://web.archive.org/web/20140612150831/https://www.diyphotography.net/pvc-backdroplight-stand/, Jun. 12, 2014 (Year: 2014).*

(Continued)

*Primary Examiner* — Peter S Vasat
*Assistant Examiner* — Stephen Alvesteffer
(74) *Attorney, Agent, or Firm* — Kammer Browning PLLC

(57) ABSTRACT

Portable physical and occupational therapy systems and methods with an adjustable balance pole assembly utilized as a target in combination with a number of manipulable objects, such as rings, that engage the target, for the purpose of exercising patients through a range of motions and through a range of cognitive actions. A basic therapy tool set incorporates a target pole of variable height, pivotally positioned on a target base. Each therapy tool set includes a number of therapy rings sized and structured to engage the target pole. The angle of the target pole may be varied by releasing a pole angle lock. The basic therapy tool set may be utilized alone or in combination with additional sets. A basic kit that may be utilized by a therapist could preferably involve three complete therapy tool sets assembled and positioned in an array around a therapy patient.

6 Claims, 11 Drawing Sheets

(52) U.S. Cl.
CPC ...... *A63B 2209/00* (2013.01); *G09B 19/0023* (2013.01); *G09B 19/0076* (2013.01)

(58) Field of Classification Search
CPC . A63B 2022/0094; A63B 22/00; A63B 23/12; A63B 2071/0694; A63B 2210/50; A63B 2225/09; A63B 2225/093; G09B 19/003; G09B 19/0076; G09B 19/0023; A61H 2201/0157; A61H 1/00
USPC ........................................................ 434/259
See application file for complete search history.

(56) References Cited

U.S. PATENT DOCUMENTS

| | | | |
|---|---|---|---|
| D344,765 S | 3/1994 | Miller, Jr. | |
| 5,490,517 A | 2/1996 | Whitman et al. | |
| 5,839,991 A | 11/1998 | Hall | |
| 7,056,269 B2 | 6/2006 | Cleveland et al. | |
| 7,249,741 B1 * | 7/2007 | Larson | A47B 13/10 108/150 |
| 8,246,524 B2 | 8/2012 | Castillo | |
| 8,678,829 B2 * | 3/2014 | Manfre | A63B 17/00 434/258 |
| 9,457,252 B2 | 10/2016 | Schwarz | |
| 2005/0075216 A1 | 4/2005 | Chu | |
| 2006/0134589 A1 | 6/2006 | Goodwin | |
| 2007/0054785 A1 * | 3/2007 | Drechsler | A63B 21/156 482/94 |
| 2010/0009783 A1 * | 1/2010 | Bozarth | A63B 69/385 473/419 |
| 2011/0136592 A1 * | 6/2011 | Keller | A63B 69/0075 473/417 |
| 2012/0040780 A1 * | 2/2012 | Fournier | A63B 69/0075 473/417 |
| 2016/0184164 A1 | 6/2016 | Browning | |

OTHER PUBLICATIONS

"Sammons Preston PVC Pipe Tree . . . ," https://www.amazon.com/Sammons-Preston-Cognitive-Activities-Occupational/dp/B002BUS66W/ref=sr_1_1?crid=1YIYWJ948B6J3&keywords=sammons+preston+PVC+tree&qid=1685731395&s=industrial&sprefix=sammons+preston+pvc+tree%2Cindustrial%2C107&sr=1-1, Jun. 1, 2009 (Year: 2009).*

"Bow and Crossbow Stand for Quick Transportation and Storage," AugHog.com, https://web.archive.org/web/20160305115002/https://aughog.com/bow-and-crossbow-stand-for-quick-transportation-and-storage/, Mar. 5, 2016 (Year: 2016).*

"Wooden Ring Stacker," Papa Don's Toys, https://web.archive.org/web/20150228063348/http://www.papadonstoys.com:80/wooden-ring-stacker/, Feb. 28, 2015 (Year: 2015).*

* cited by examiner

PORTABLE PHYSICAL AND OCCUPATIONAL THERAPY SYSTEMS AND METHODS

BACKGROUND OF THE INVENTION

1. Field of the Invention

The present invention relates generally to physical and occupational therapy tools and methods. The present invention relates more specifically to balance pole structures and methods for their use that assist with the rehabilitation of a patient through physical and cognitive therapies.

2. Description of the Related Art

Physical therapists and occupational therapists have a wide range of tools and methods available to them to facilitate the rehabilitation of patients that require such recovery therapies. Some of these tools and methods are designed to address both physical and cognitive limitations that the patient may be experiencing as a result of illness or injury. While a wide range of structures and tools have been developed to assist therapists in the rehabilitation of a patient, very few might be considered to be portable in nature. In addition, the tools and methods that provide rehabilitation are generally dedicated only to physical therapies or only to occupational or cognitive therapies. Those systems that attempt to address both physical and occupational therapies with a patient at the same time are generally not portable in nature and typically require the patient to visit a therapist's office or clinic in order to engage in the rehabilitation activities. The portable tools that therapists do have available to them (such as resistance bands, step platforms, and the like) are typically limited in the range of exercises or activities that they can be implemented with.

Balance poles of different heights and orientations can provide a variety of options for a physical therapist and occupational therapist in the process of rehabilitating a patient. Existing therapy systems that utilize balance poles, however, tend to be fixed or stationary structures that the therapy patient must visit the therapist's office or clinic to utilize. Therapies associated with the use of balance poles or post targets and the like, are generally not constructed in such a way that a therapist can transport one or more of the structures to the location of the therapy patient. In addition, such existing tools and structures as may be found in a rehabilitation clinic are generally adaptable to but one or two methods of use. At best, a therapy clinic might provide a number of stations with variously configured poles and posts, used as sitting and/or standing targets along with an assortment of manipulable objects for one or more therapy patients to engage with on a rotating basis.

There are a range of diagnoses that result in a patient being prescribed sitting and/or standing therapies in order to improve their dynamic balance. Sitting balance as an initial goal is highly important for performing activities such as bed mobility, transfers, and other activities of daily living (ADL's). Patients should be able to complete balance activities that a therapist might direct, from their own wheelchair, from a firm or soft seated surface such as a treatment table, from an adjustable treatment mat, or from a hospital bed. Patients should be able to engage in a range of motion exercises that gradually provide the sitting balance that is required by ADL's. Various sitting therapies should allow a patient to work their shoulders, elbows, and wrists through a range of motions that vary according to height and distance from the patient. Varying the distance that the patient is required to move through can greatly facilitate the overall rehabilitation process. It is also important to incorporate mid-line training in seated physical therapy activities, especially when the therapy is part of neural rehabilitation. Diagonal training is a key component of neural rehabilitation and requires the therapy patient to exercise through a wide range of directional motions for arms, elbows, wrists, and hands that will address a wide variety of motion dysfunctions. Seated activities with such motion therapies allow patients to perform the activities generally unattended with relative safety.

Dynamic standing balance also plays a key role in everyday human function. The primary focus for improving dynamic standing balance is to reduce the risk of falls and provide safety and independence with functional mobility such as gait (walking). Patients that are able to complete standing exercises should thereafter be able to work on a variety of dysfunctions to improve overall dynamic standing balance. The initial step of performing a sit-to-stand activity improves gluteal strength and focuses on independence with transfer training and the like. Once in a standing position, therapy patients should again be able to work with across mid-line training activities, especially if their diagnosis is in any way neurologically related. Therapy patients should also be able to work on functional endurance training in the standing position. Endurance training can be used with a goal of improving the patient's functional standing tolerance which carries over into day-to-day functions such as walking to a car, performing ADL's such as teeth brushing, grooming, dressing, preparing meals, etc.

As with sitting therapies, standing therapies should also vary with respect to distance and angular motion to allow for stretching to various heights and leaning to various angles without jeopardizing standing balance. Eventually in a rehabilitation process, dynamic standing balance can be further challenged by introducing an unstable surface to the therapy activities. Unstable surfaces improve core strength and dynamic standing balance while the patient performs functional movements of the upper extremities and torso carrying out the range of motion, and the cognitive aspects of the therapy.

Speech therapists may also use a number of different physical and occupational therapy tools to improve cognitive function and to address neurological processing dysfunctions. Patients can be required, for example, to perform activities that involve duplication of viewed patterns. Errors by the patient in duplicating such patterns can be recorded by the therapist and goals can be set to reduce the number of errors. Patients can be given a variety of patterns and be required to complete a wide range of tasks associated with the patterns using two-dimensional or three-dimensional tools and structures. Very detailed procedures maybe communicated to the patient orally or visually to direct the therapy patient to utilize various therapy tools to carry out range of motion, cognitive identification, and balance stability activities.

Once again, while a number of therapy tools and methods have been developed that address the activities and issues described above, few if any such tools and systems might be considered portable in nature, such that the physical or occupational therapist could bring the tools to the patient as opposed to requiring the patient to visit a fully outfitted rehabilitation clinic. Even among those tools and systems that are in use in rehabilitation clinics and the like that do provide these activities, most are narrowly focused on a single type of activity, rarely combining both physical and cognitive actions into a single activity, such that a therapy patient might engage in the activities without significant supervision.

There is, therefore, a need for portable physical and occupational therapy systems and methods that a therapist may use alone or in combination with other similar systems to provide a wide range of rehabilitation activities to therapy patients, especially those that are not able to utilize a centralized rehabilitation clinic or the like. It would be desirable if such a portable therapy tool system could be utilized alone or in combination with other similar systems to provide a wide range of sitting or standing, physical or occupational, therapies for the rehabilitation of the patient.

SUMMARY OF THE INVENTION

The present invention therefore provides portable physical and occupational therapy systems and methods with a uniquely adjustable balance pole assembly utilized as a target in combination with a number of manipulable objects, such as rings, that engage the target, all for the purpose of exercising patients through a range of motions and through a range of cognitive actions. The present invention provides a basic therapy tool set that incorporates a target pole of variable height utilizing a number of shorter pole sections connectable together. The target pole is pivotally positioned on a target base that provides stability to the pole when oriented vertically or at an angle. Each therapy tool set preferably includes a number of therapy rings sized and structured to be placed over the target pole top end and thereby be positioned on the target pole in either a random or patterned order. The height of the target pole may be varied by utilizing one or more pole sections at a time. The angle of the target pole with respect to the vertical (and therefore with respect to a horizontal platform on which the therapy tool set is placed) may be varied by releasing a pole angle lock on the target base to allow the pole to pivot and move to a new locking engagement point at a preset angle. Alternate pole height and pivot structures are anticipated that allow for variability in the height and angle of the target pole.

While the basic therapy tool set of the present invention may be utilized alone, it finds its best use in combination with additional therapy tool sets structured the same or similarly, and arranged in positions around the therapy patient in a manner that requires a variety of different motions be carried out according to the therapy regimen specified. A basic kit utilized by a therapist would preferably involve three complete therapy tool sets that may each be assembled and positioned in an array around a therapy patient for implementation of a wide range of physical and cognitive therapy routines.

DETAILED DESCRIPTION OF THE PREFERRED EMBODIMENTS

Figure 1:
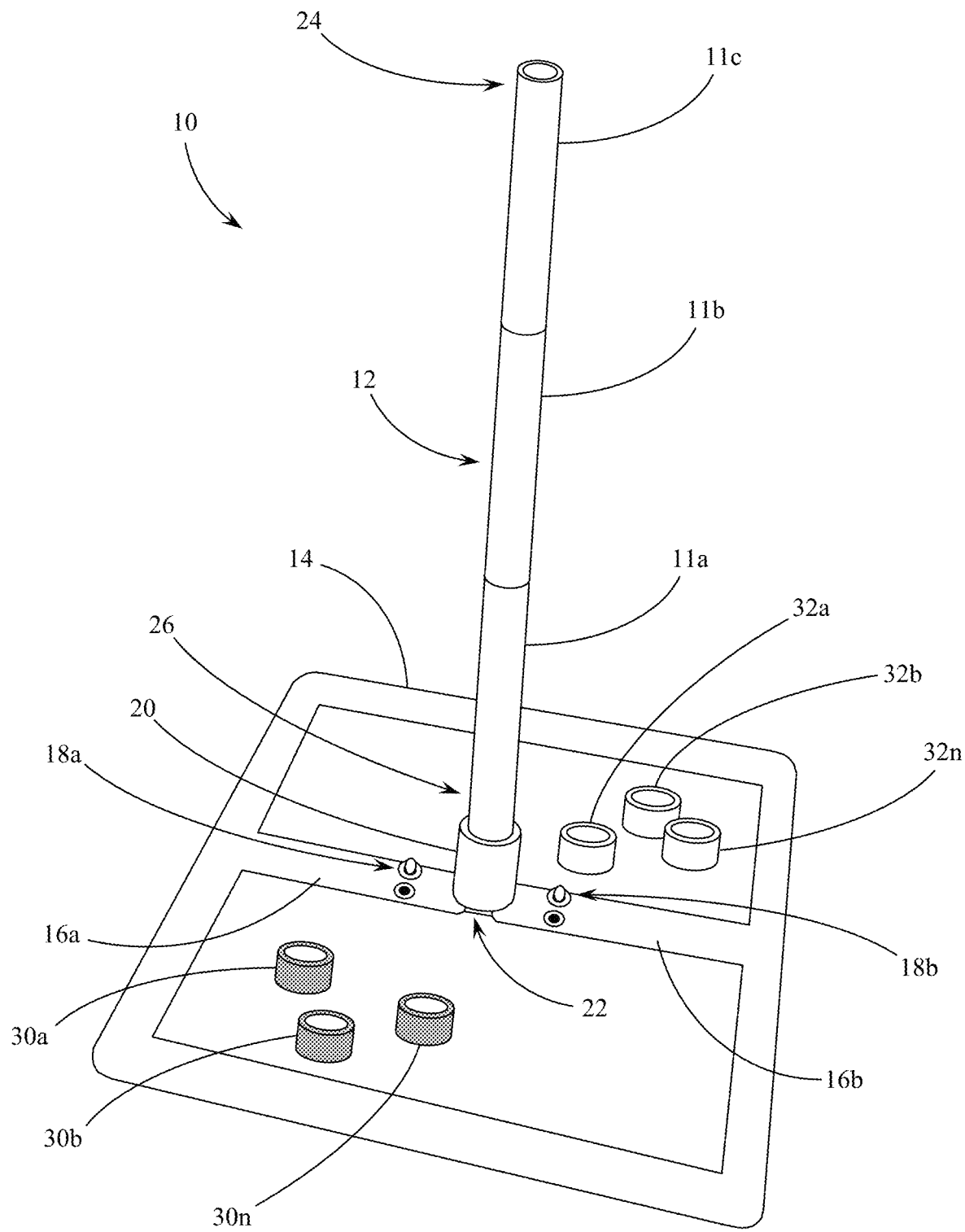
FIG. 1 is a perspective view of the basic unit of the therapy tool set of the present invention shown in an assembled condition ready for use.

Reference is made first to FIG. 1 for a perspective view of a first structural embodiment of the basic unit for the therapy tool set of the present invention. Therapy tool set 10, shown in FIG. 1 fully assembled and ready for use, incorporates two primary structural components. Target pole 12 is fixed in an upright position on top of and extending from target base 14. Target pole 12 is preferably constructed of target poles sections 11a-11c. Breaking target pole 12 down into sections 11a-11c facilitates not only the storage and transport of therapy tool set 10, but also the use of the therapy tool with target poles of different heights. Pole sections 11a-11c may be press fit one into the other or may include threaded connectors and/or spring pin connector locks. However the pole sections are connected together, they should present a smooth overall exterior surface such that therapy rings and the like may be easily placed on the target pole top end 24 and slide down to the target pole bottom end 26.

Target pole 12 is secured to target base 14 by insertion of target pole bottom end 26 into pole socket 20. Target base 14 (generally square in this first embodiment) incorporates base cross beams 16a & 16b that extend from the perimeter of target base 14 to pole pivot 22 which pivotally supports pole socket 20. In a preferred embodiment, pole pivot 22 comprises an inverted tee connector that rotates inside base cross beams 16a & 16b and extends upward to where it is fixed with pole socket 20. This structure provides a pivot point whereby target pole 12 may be fixed in a vertical upright position, or may be pivoted at an angle by releasing pole angle locks 18a & 18b and rotating target pole 12 on pole pivot 22 to a predetermined offset angle, whereby pole angle locks 18a & 18b reengage with alternate apertures. Although the present invention as shown in FIG. 1 utilizes a specific type of spring loaded pin-in-aperture lock, with an inner cylinder rotating in the outer cylinder of base cross beam 16a & 16b, various alternate structures for establishing a variable angle pivot point on target base 14 are anticipated.

Once assembled as shown in FIG. 1, therapy tool set 10 may be oriented and positioned alone or in combination with additional tool sets to provide a versatile therapy system offering a wide range of methods of use. In general, the purpose of the therapy tool set is to provide a target and a number of manipulable objects (therapy rings in the described embodiment) that are directed toward and are intended to engage the target. In FIG. 1, two sets of therapy rings are provided, a first set 32a-32n preferably having a first color, along with a second set of therapy rings 39a-30n preferably of a second and distinct color. Different therapy ring colors, of course, allow for various cognitive therapy methods to be implemented.

Therapy tool set 10 shown in FIG. 1 may be constructed from a range of different materials. While it is preferable that the tool set be compact and lightweight, it is also desirable that it be rugged and inexpensive to manufacture. Components made of PVC plastic tubular structures, including the therapy rings, are suitable for the present invention. Other lightweight plastic or metal components may likewise serve adequately for the structural materials that make up the parts and pieces of the therapy tool set.

The size of each therapy tool set 10 as shown in FIG. 1 is dependent upon the range of motion exercises and therapies that it is intended to be used with. Because the tool set may be used with a therapy patient in either a sitting or standing position, some variability in the height is required. Once again, the pole sections as shown in FIG. 1 facilitate the use of tool sets of varying height. The various methods of use described herein below are facilitated best by therapy tool sets that can vary in height from as low as two feet to as high as four feet, although the use of higher structures may be anticipated. Although the example in FIG. 1 incorporates two therapy ring sets, each containing three rings, the number of rings appropriate for use with a single therapy tool set is not so limited. Again, as can be seen from the various methods of use described below, a large number of rings can be provided for implementation of a wide range of therapy methods.

Although each of the components of the present invention may be manufactured from the same type of material and retain the same basic color in appearance, it is preferable for the therapy ring sets to be of distinct colors for the purpose of implementing a range of cognitive therapies in addition to the physical therapies associated with simple ring and target placement. It is also preferable with some therapies to have target poles of distinct colors (described in more detail below) which color may be imparted to the components either at the manufacturing stage where colors are incorporated into the plastic material (for example) or later in the manufacturing process where components may be coated with particular colors. Additionally, color sleeves (not shown) may be used in connection with different target poles in order to vary the color of a specific target pole for use in a grouping of therapy tool sets.

Figure 2:
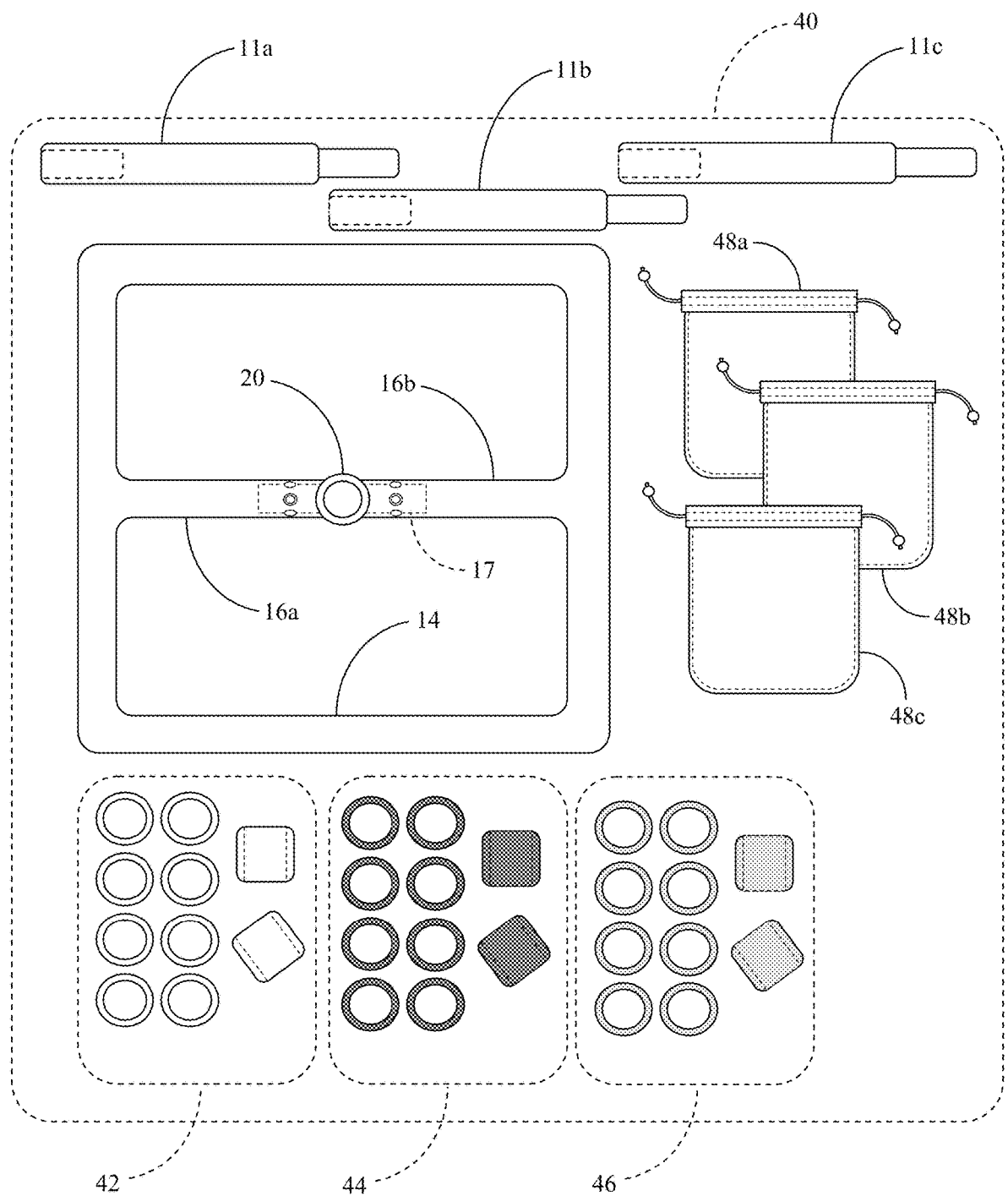
FIG. 2 is a top plan view of a kit making up the basic unit of the therapy tool set of the present invention shown in an unassembled condition.

FIG. 2 describes a preferred embodiment for a therapy kit 40 that incorporates one complete therapy tool set such as therapy tool set 10 shown in FIG. 1 along with a wider array and number of therapy rings. Therapy kit 40 is structured to be collapsible and easily portable to allow a therapist to bring one or more such kits to a therapy session. The entire kit preferably includes the target pole, here broken down into pole sections 11a-11c, as well as target base 14 shown separated from target pole sections 11a-11c. Target base 14 in FIG. 2 is shown in this top plan view to include base cross beams 16a & 16b which extend towards the center and support pole socket 20. The pole pivot structure described generally in FIG. 1 is seen to be made up of the inverted t-shaped section 17 that rotates within the cylindrical interior of base cross beams 16a & 16b and is rotationally fixed into position the using pole angle locks as described above.

A larger selection of therapy rings are shown in FIG. 2 as preferably being included in therapy kit 40, with therapy rings of a first color 42 provided, therapy rings of a second color 44 provided, and therapy rings of a third color 46 provided. These therapy ring sets are preferably stored and transported in ring bags 48a-48c. As indicated above, a therapist may have one or more therapy kits 40 as shown in FIG. 2 which may be used alone or in connection with other kits in various arrangements that are shown in and described with FIGS. 4A & 4B (for example).

Figure 3:
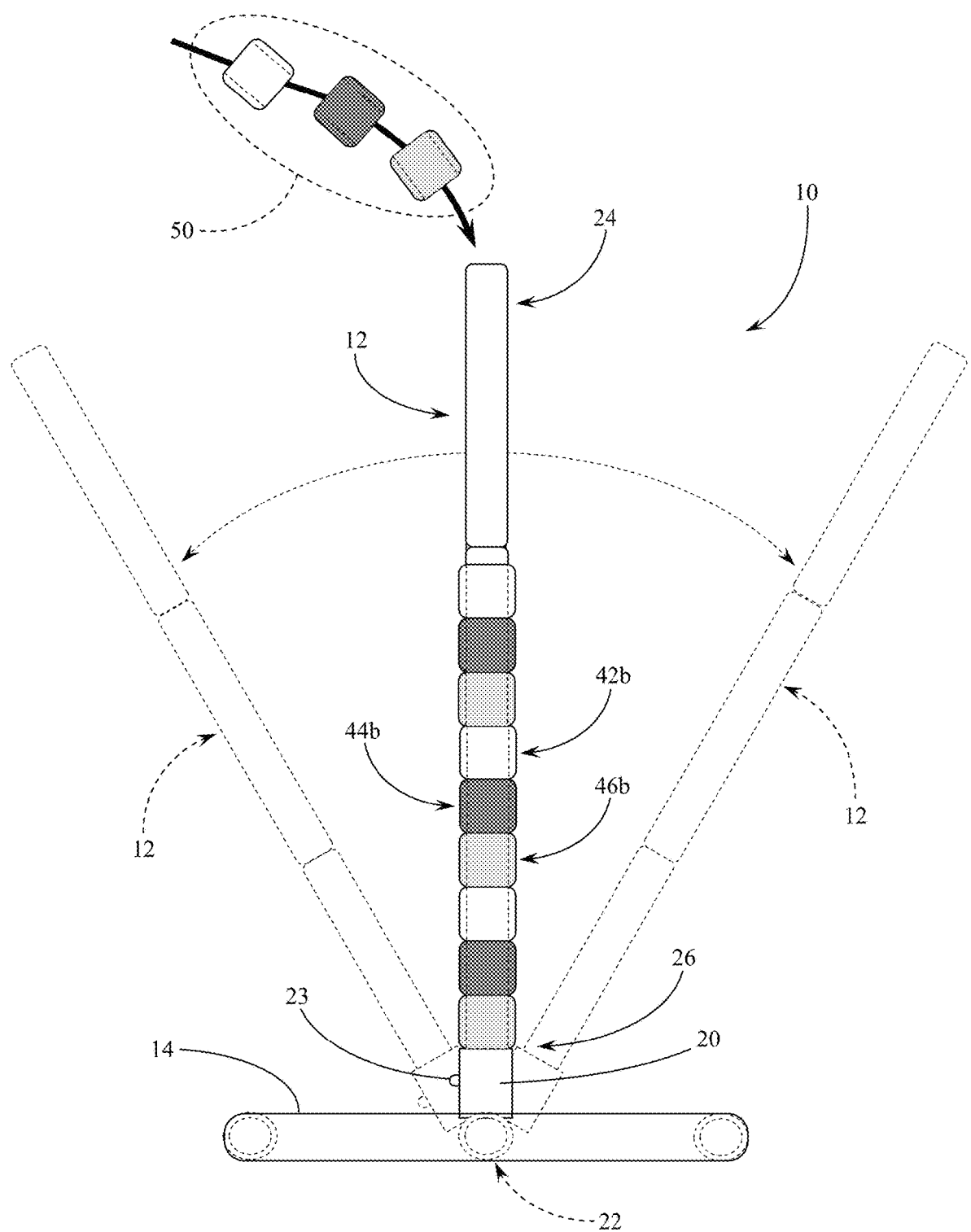
FIG. 3 is an elevational side view of the basic unit of the therapy tool set of the present invention shown in an assembled condition ready for use, demonstrating the tilting angle feature of the invention.

FIG. 3 shows the basic use of therapy tool set 10 over a range of angles provided by pole pivot 22 configured on target base 14. Target pole 12 as shown in FIG. 3 is again constructed preferably in pole sections (three in the embodiment shown) and is secured into pole socket 20 preferably with pole socket lock 23. The therapist chooses not only the height of target pole 12 by selecting one, two, or three pole sections, but also selects the angle at which target pole 12 is to be positioned for the specific therapy session. Target pole 12 may be positioned directly upright, or may be angled at one or more preset angles to either side to alter (increase or decrease) the range of motion that the therapy patient is to utilize. Although a wide range of angles are possible, altering target pole 12 by 15 degrees, 30 degrees, or 45 degrees from the vertical provides an adequate range of different distances or angles for the physical therapy to be carried out. At the various preset angles, and with target base 14 stationary on the floor or other support surface, target pole top end 24 can be positioned in a wide range of locations to direct the therapy patient's engagement of the therapy rings onto the target pole.

In the example shown in FIG. 3, the therapy patient is in the process of placing therapy rings 50 onto target pole 12 in a specific ordered manner based upon the color of the rings. In the example shown, one of the therapy rings of a third color is placed first on target pole 12, followed by a therapy ring of a second color, and thereafter a therapy ring of a first color. These therapy rings, for example, may be placed by the therapist with instructions to the patient to duplicate the pattern of the rings on the target pole 12. Thereafter, the therapy patient may place ring 46b of the third color, followed by ring 44b of the second color, followed by ring 42b of a first color to duplicate the pattern established by the therapist. Additional sets of three different colored rings may then follow as shown with ring set 50 in FIG. 3. This basic cognitive exercise may be carried out on the single therapy tool set 10 in a range of angled positions to provide physical motion therapy at the same time as the cognitive activities occur.

Figure 4A:
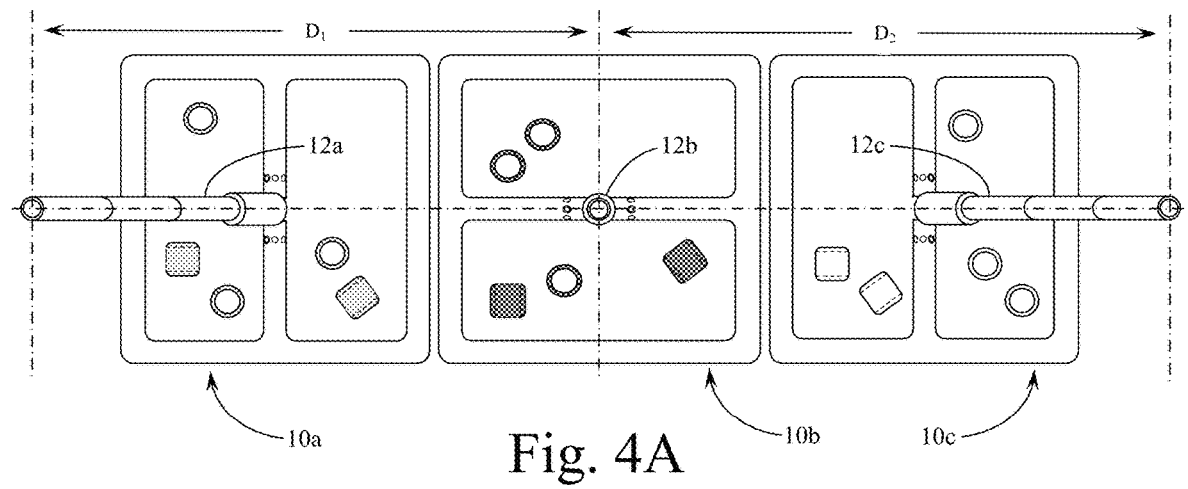
FIG. 4A is a top plan view of a group of three therapy tool sets of the present invention shown in a linear arrangement with two of the target poles angled outward.
Figure 4B:
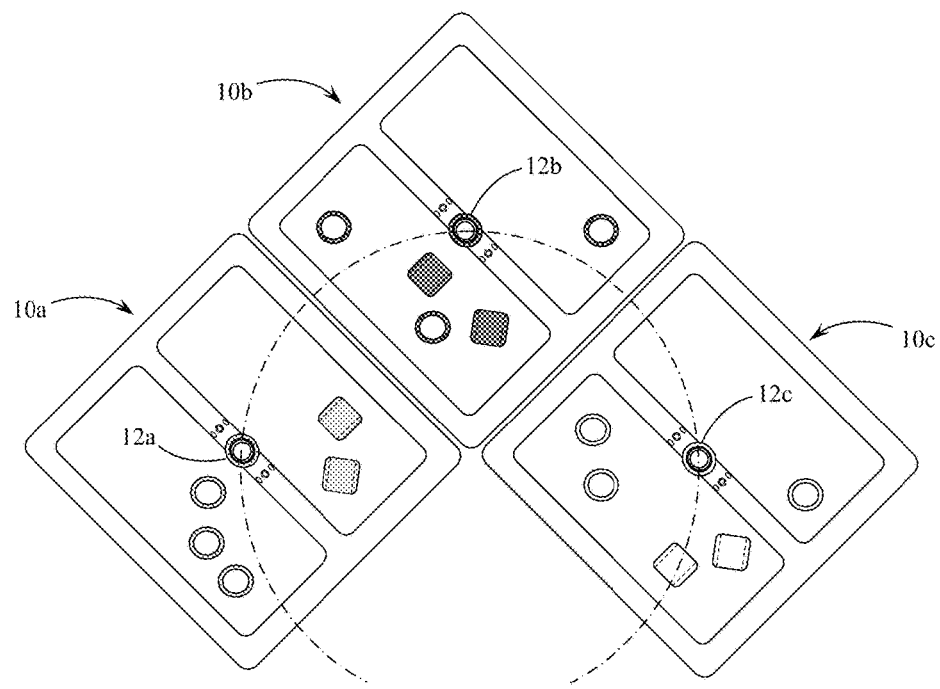
FIG. 4B is a top plan view of a group of three therapy tool sets of the present invention shown in a right angle arrangement with each of the target poles positioned vertically.

Reference is next made to FIGS. 4A & 4B for a description of alternate arrangements of multiple therapy tool sets of the present invention. In each of FIGS. 4A & 4B three therapy tool sets 10a-10c are utilized in an arrangement that allows for variability in the therapy regimen. In FIG. 4A, therapy tools sets 10a-10c are positioned in a linear arrangement to provide three target poles at spaced distances from each other. In addition to varying the distance between each therapy tool set 10a-10c, the angle of each target pole 12a-12c may be varied so as to increase or decrease the distance between the respective target pole top ends. In the example shown in FIG. 4A, a distance $D_1$ is established between a center therapy tool set target pole 12b and a left therapy tool set target pole 12a. This orientation places the therapy patient (either seated or standing) in front of the linear array of therapy tool sets 10a-10c with tool set 10a positioned on their left and tool set 10c positioned on their right. $D_1$ therefore represents a range of motion distance between a center line and the angled extreme point of placement for the target pole top end for tool set 10a. Distance $D_2$ represents a right range of motion from the same center point to the right of the therapy patient. These distances, of course, may be independently varied if, for example, the therapy patient's right or left side requires greater range of motion rehabilitation. While cognitive therapies could be used with the arrangement shown in FIG. 4A, this linear arrangement of multiple therapy tool sets lends itself most readily to modifying and varying range of motion by increasing distances $D_1$ & $D_2$ from very small (where 12a & 12c may be angled inward toward target pole 12b) or very large as is shown in the example of FIG. 4A.

FIG. 4B provides a similar structural arrangement to the linear arrangement of FIG. 4A except that the left and right tool sets 10a & 10c are positioned closer in to the patient. This arrangement of tool sets 10a-10c may be of benefit for therapies that involve radial motion in a clockwise or counter-clockwise progression as is suggested by the broken line in FIG. 4B. Although not shown in FIG. 4B, target poles 12a-12c could likewise be angled either away from the therapy patient or towards the therapy patient to provide a small diameter radial range of motion process or a larger diameter radial range of motion. It will be recognized, for example, that therapy tool set 10a might be turned 90 degrees so that target pole 12a may be angled outward rather than to the side. Similar reorientations of therapy tool sets 10b & 10c may accommodate larger or smaller range of motion therapies.

Although the square base configuration of the present invention shown in FIGS. 4A & 4B lends itself to the linear and angled arrangements shown, alternate embodiments with circular or S-shaped bases (described in more detail below) could likewise be implemented in the same types of groups and arrangements. The essential features of the base structure include stability over a range of angles (for the target pole); collapsibility for transport; and some facilitation of the placement of therapy tool sets next to each other. Additionally, simple clips snapped over the base structures of two adjacent therapy tool sets may be used to improve stability and maintain the arrangement of multiple therapy tool sets established by the therapist.

Figure 5A:
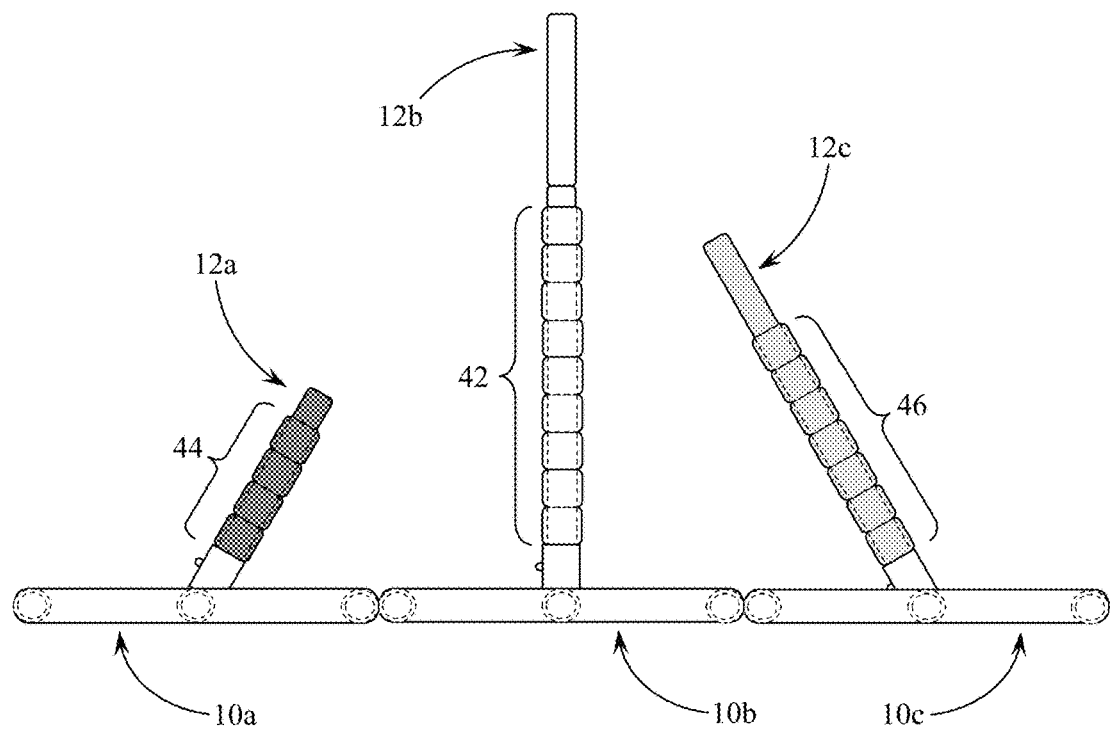
FIG. 5A is an elevational side view of a group of three therapy tool sets of the present invention with varying heights and of different colors, shown in a linear arrangement with two of the target poles angled inward.
Figure 5B:
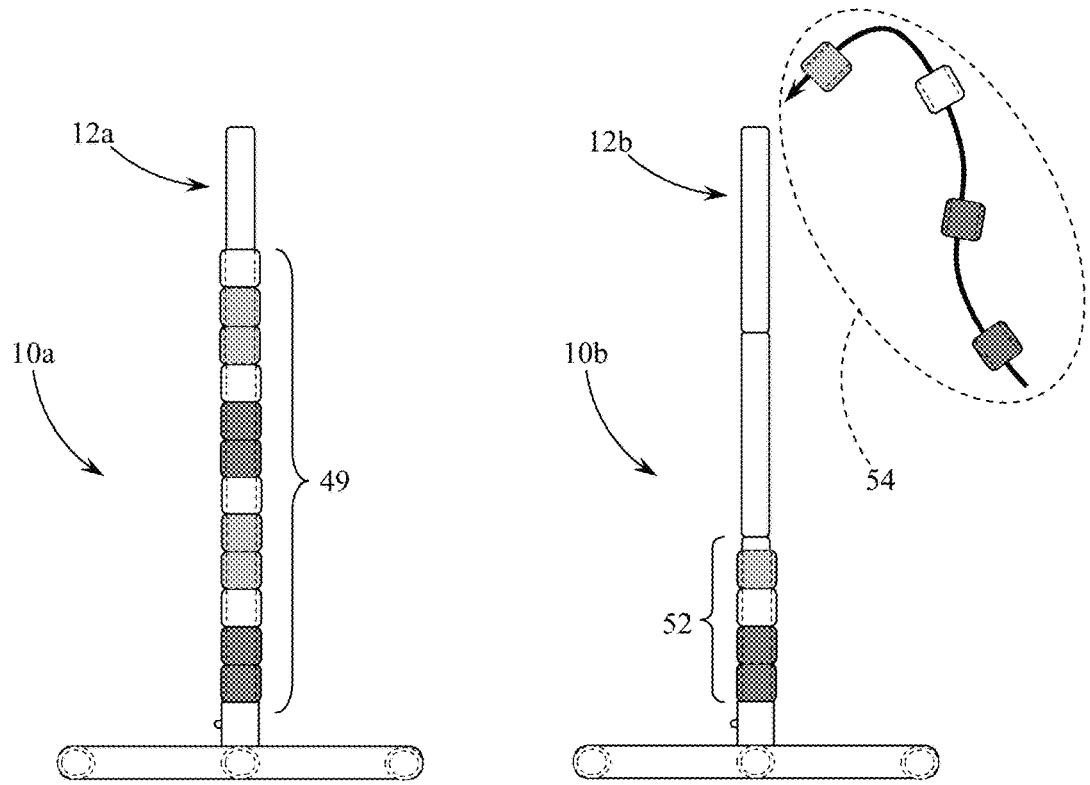
FIG. 5B is an elevational side view of two therapy tool sets of the present invention shown with a pattern of rings on the first set to be emulated on the second set.

Reference is next made to FIGS. 5A & 5B which are elevational views of groups of therapy tool sets used in additional types of therapy regimens. FIG. 5A shows, as an example, the same alignment shown in FIG. 4A with a group of three therapy tool sets 10a-10c, but with the target poles angled in different directions and configured with different lengths. In this arrangement, a first therapy tool set 10a is configured with a single target pole section forming target pole 12a angled inward towards a second therapy tool set 10b. The second therapy tool set 10b is configured with a long target pole 12b, in this case made up of three target pole sections. Finally, a third therapy tool set 10c is positioned to the right of the center therapy tool set 10b and is configured with two target pole sections forming target pole 12c and angled inward toward the center pole. Again, the arrangement shown is merely representative of a wide variety of arrangements and configurations that one or more of the therapy tool sets may be set up in.

Additionally shown in FIG. 5A is the use of distinct target pole colors, established either with color manufactured into the material of the target pole sections (such as colored plastic molded material), using colored coatings on the pole material, or through the use of colored sleeves (not shown) that extend over a neutral colored pole material. In any case, the arrangement shown in FIG. 5A lends itself to not only physical therapies addressing range of motion and the like, but also cognitive therapies where color matching might be required between a first color set of therapy rings 42 that are positioned on the center therapy tool set 10b with a second color set of therapy rings 44 positioned on a similarly colored therapy tool set 10a. Finally, a third color set of therapy rings 46 is positioned on a like colored therapy tool set 10c. Once again, a wide range of therapy methods may be implemented in conjunction with the basic grouping of three variable height, different colored, therapy tool sets.

FIG. 5B provides an example of the use of two therapy tool sets 10a & 10b, one of which (10a) is established with a reference pattern 49 of therapy rings already in place on target pole 12a. The therapist may, for example, create an orderly or random sequence of therapy ring colors in the reference pattern 49 and direct the therapy patient to duplicate the pattern on a second therapy tool set 10b. In this case, the placement and angle of the target pole 12b is less important than the matching of the reference pattern established by the therapist. FIG. 5B shows the therapy patient establishing the initial pattern of rings 52 on therapy tool set 10b and in the process of adding additional rings 54 copying the pattern to the top end of target pole 12b in an effort to recreate the overall reference pattern 49 established by the therapist. Once again, the pattern matching process shown generally in FIG. 5B may be combined with any of a range of motion exercises and therapies suggested by the arrangements of FIGS. 4A & 4B.

Figure 6A:
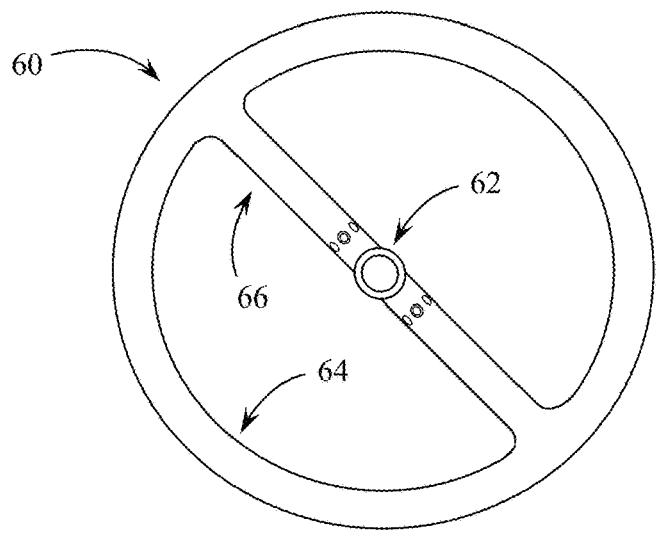
FIG. 6A is a top plan view of an alternate structure for the target base of a therapy tool set of the present invention.
Figure 6B:
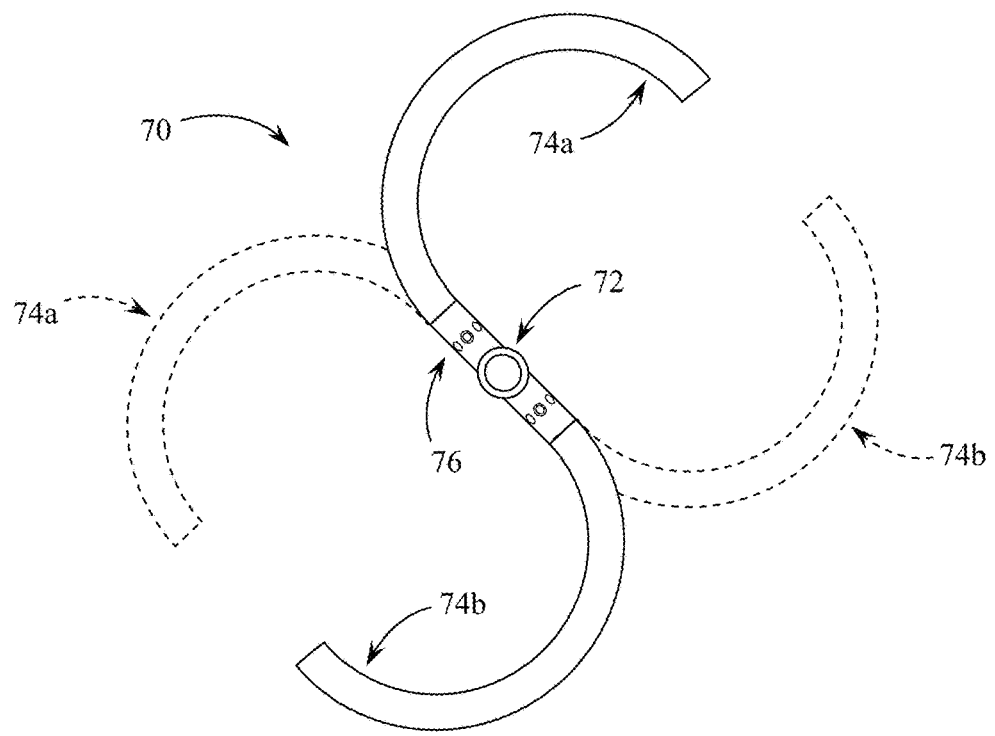
FIG. 6B is a top plan view of a further alternate structure for the target base of a therapy tool set of the present invention.

As indicated above, the present invention anticipates the use of various types of target bases to provide stability to the target pole in both an upright position and at an angle. The size and shape of the target base must be adequate to maintain stability for the therapy tool set, even when an extreme angle (45 degrees, for example) might be implemented on the particular target pole extending from the target base. Two alternate base structures are shown in FIGS. 6A & 6B. FIG. 6A shows a circular target base 64 for therapy tool set 60 that is similar in many respects to the square or rectangular base shown in the above described embodiments. Target base 64 includes base beam 66 preferably with pole pivot 62 structured in a manner identical to that shown above with the square or rectangular base. One advantage of the circular base shown in FIG. 6A is the ability to rotate the orientation of base beam 66 in any direction without concern for contact between the edges or corners of the base as would be of concern with a square or rectangular base. In this manner, the angle of the target pole configured with therapy tool set 60 may be less restricted in its orientation as compared to the more limited orientations shown in FIGS. 4A & 4B utilizing square bases.

FIG. 6B provides a therapy tool set 70 with an even more versatile S-shaped or C-shaped base. In the versatile embodiment shown in FIG. 6B the base is made up of first base arm 74a and second base arm 74b. Each of these semi-circular arms are connected to a residual base cross beam that supports an inverted tee connector that serves as pole pivot 72. The versatility of the design shown in FIG. 6B lies in being able to position the base arms 74a & 74b independent of each other. In one configuration, an S-shaped base is established (solid lines shown in FIG. 6B) or in an alternate arrangement first base arm 74a maybe flipped over on the same side of the target pole as shown in broken line 74a position.

The S-shaped or C-shaped base shown in FIG. 6B lends itself to interlacing of multiple therapy tool sets with the base arms of each extending into a base arm of an adjacent therapy tool set. In this manner, a compact arrangement of target poles may be established. In any case, the independently movable base arms 74a & 74b continue to provide the required stability and versatility with regard to the use of a long target pole vertically oriented, or shorter target poles, each of which may be angled as described above. Other geometries for the target base are anticipated and as long as the primary requirement of maintaining stability through a range of target pole angles is met, alternate geometries may allow for an even greater range of therapies by positioning the target pole top ends of a number of therapy tool sets in an almost infinite range of positions.

Reference is next made to FIGS. 7-11 for detailed descriptions of representative methods associated with the use of the therapy systems described above. These methods for using the structures and devices of the present invention provide a wide range of both physical and occupational therapies. That is, the systems of the present invention are designed to provide therapies for both physical rehabilitation and cognitive rehabilitation. The methods described below may be carried out with one or many of the standard therapy tool sets described above. The various embodiments of the tool sets described lend themselves to a wide range of therapy methods that are generally categorized and outlined by the specific method procedures described.

Figure 7:
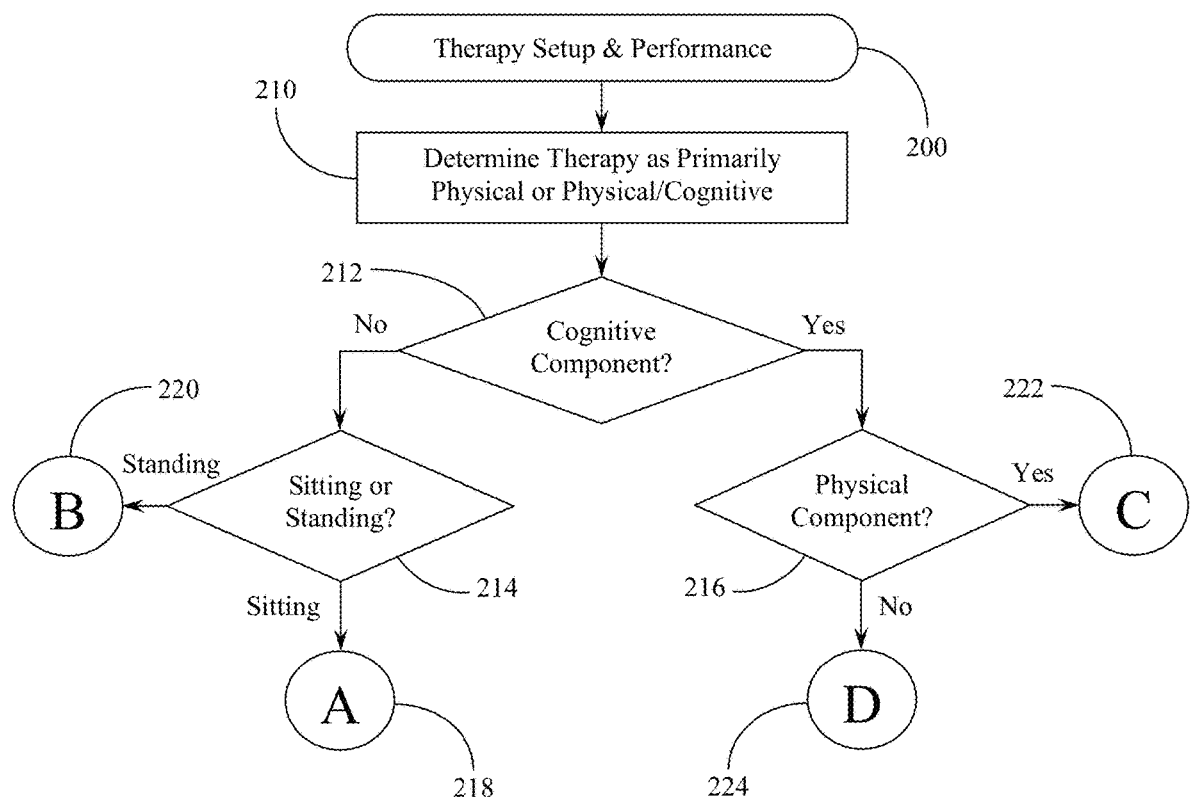
FIG. 7 is a high level flowchart showing the basic therapy planning steps associated with a typical manner of utilizing the therapy tool sets of the present invention for both physical therapy and cognitive therapy.

Reference is made first to FIG. 7 for a flowchart showing the method for setting up the therapy activity and carrying out performance of the process. Therapy setup and performance routine is initiated at Step 200 and begins with the therapist initially determining at Step 210 whether the therapy is to be primarily directed to physical rehabilitation or a combination of physical and cognitive rehabilitation. If there is a cognitive component, determined at decision Step 212, then the therapist determines at decision Step 216 whether there should also be a physical component to the therapy. If there should also be a physical component to the therapy, then the process proceeds to therapy routine Step 222 (Connector C) shown in detail in FIG. 10. If there is a cognitive component but not a significant physical component, then the process proceeds to therapy routine Step 224 (Connector D) shown in detail in FIG. 11.

If there is not a primary cognitive component (i.e. the primary objective of the therapy is physical rehabilitation) then the decision process moves to decision Step 214 to determine whether the therapy patient should be sitting or standing. If standing, the process continues to therapy routine Step 220 (Connector B) shown in detail in FIG. 9. If the therapy patient is to be sitting during the therapy, then the process proceeds to therapy routine Step 218 (Connector A) shown in detail in FIG. 8.

Figure 8:
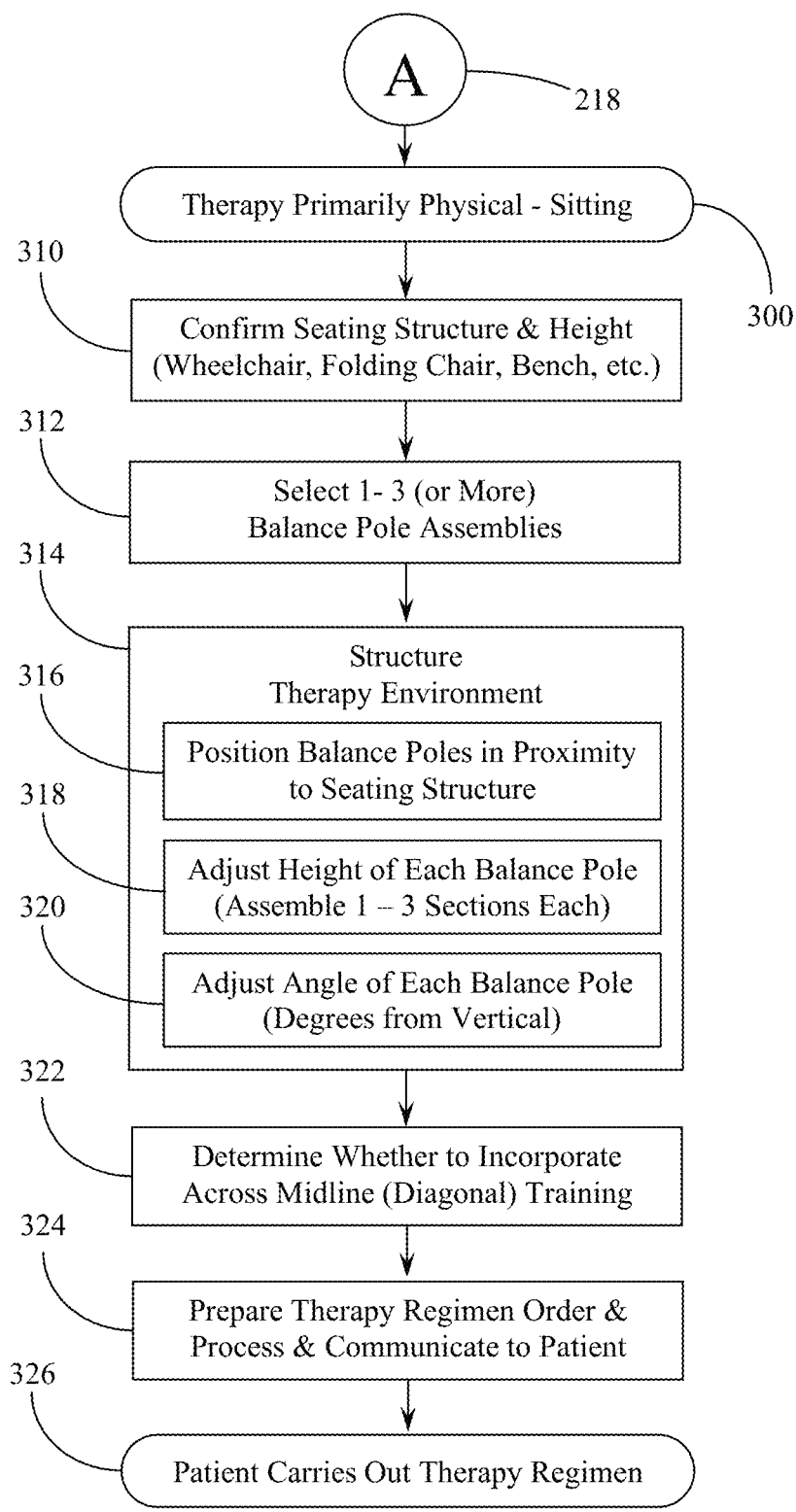
FIG. 8 is a flowchart showing the basic therapy process steps associated with a primarily physical therapy regimen carried out in a sitting position utilizing the therapy tool sets of the present invention.

FIG. 8 provides, beginning with Step 300, a therapy that is directed primarily to physical rehabilitation with the therapy patient in a sitting position. Step 310 involves the therapist confirming the seating structure and height appropriate for use with the particular therapy patient. This step involves determining whether the patient is in a wheelchair, a folding chair, a therapy bench, or another type of seating arrangement. The nature of the sitting position is determinative of both the number of therapy tool sets utilized, as well as their height and angular orientation.

At Step 312, the therapist selects one to three (or more) balance pole assemblies to be used in this primarily physical therapy setting. Step 314 involves the process of structuring the therapy environment, including positioning balance poles in proximity to the therapy patient's seating structure at Step 316; adjusting the height of each balance pole by, for example, assembling one to three pole sections for each of the balance pole assemblies at Step 318; and adjusting the angle of each balance pole by some orientation from the vertical at Step 320.

Next in the process, the therapist determines whether to incorporate across mid-line or diagonal training at Step 322 before beginning the preparation of the step by step therapy regimen. The therapist then prepares the therapy regimen order and procedure at Step 324 and communicates this in writing or orally to the therapy patient. Finally, at Step 326 the therapy patient carries out the therapy regimen according to the directions received from the therapist.

Figure 9:
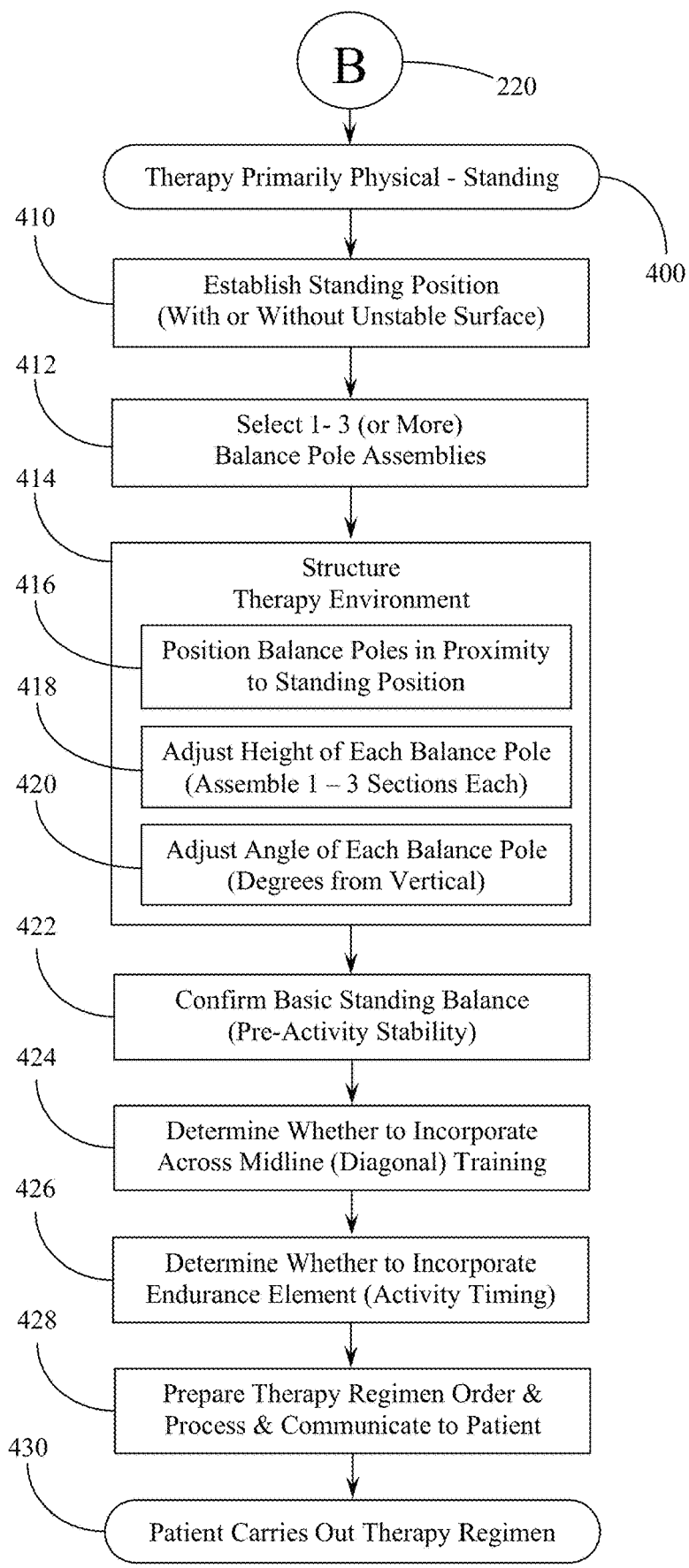
FIG. 9 is a flowchart showing the basic therapy process steps associated with a primarily physical therapy regimen carried out in a standing position utilizing the therapy tool sets of the present invention.

FIG. 9 discloses a second general category of therapy, comprising a primarily physical therapy process, with the therapy patient in a standing position. Initiated at Step 400, the primarily physical standing routine begins in much the same manner as the primarily physical sitting routine. At Step 410 the therapist establishes the specific standing position that the therapy patient will take. Because part of many physical therapy routines involve the therapy patient standing on an unstable surface the therapist decides at Step 410 whether or not to implement the therapy system of the present invention on a stable or unstable surface. At Step 412 the therapist selects one to three (or more) balance pole assemblies to be utilized in the therapy.

Again, the therapist structures the therapy environment at Step 414 which includes positioning the balance poles in proximity to the standing position of the therapy patient at Step 416; adjusting the height of each balance pole by assembling one to three balance pole sections for each balance pole assembly at Step 418; and adjusting the angle of each balance pole at Step 420.

At Step 422 the therapist confirms the basic standing balance position by determining the pre-activity stability of the therapy patient. Modifications to the stable or unstable surface on which the therapy patient is standing may be made. The therapist determines whether to incorporate across mid-line or diagonal training at Step 424. An additional parameter included in the standing therapy regimen involves an endurance element associated with activity timing. The therapist determines at Step 426 whether to incorporate such an endurance element in the therapy session by establishing timing parameters for either intermittent activity completions or total activity completion times. Finally, the therapist prepares the overall therapy regimen order and process at Step 428 and communicates this to the therapy patient. At Step 430 the therapy patient carries out the therapy involving the primarily physical standing regimen.

Figure 10:
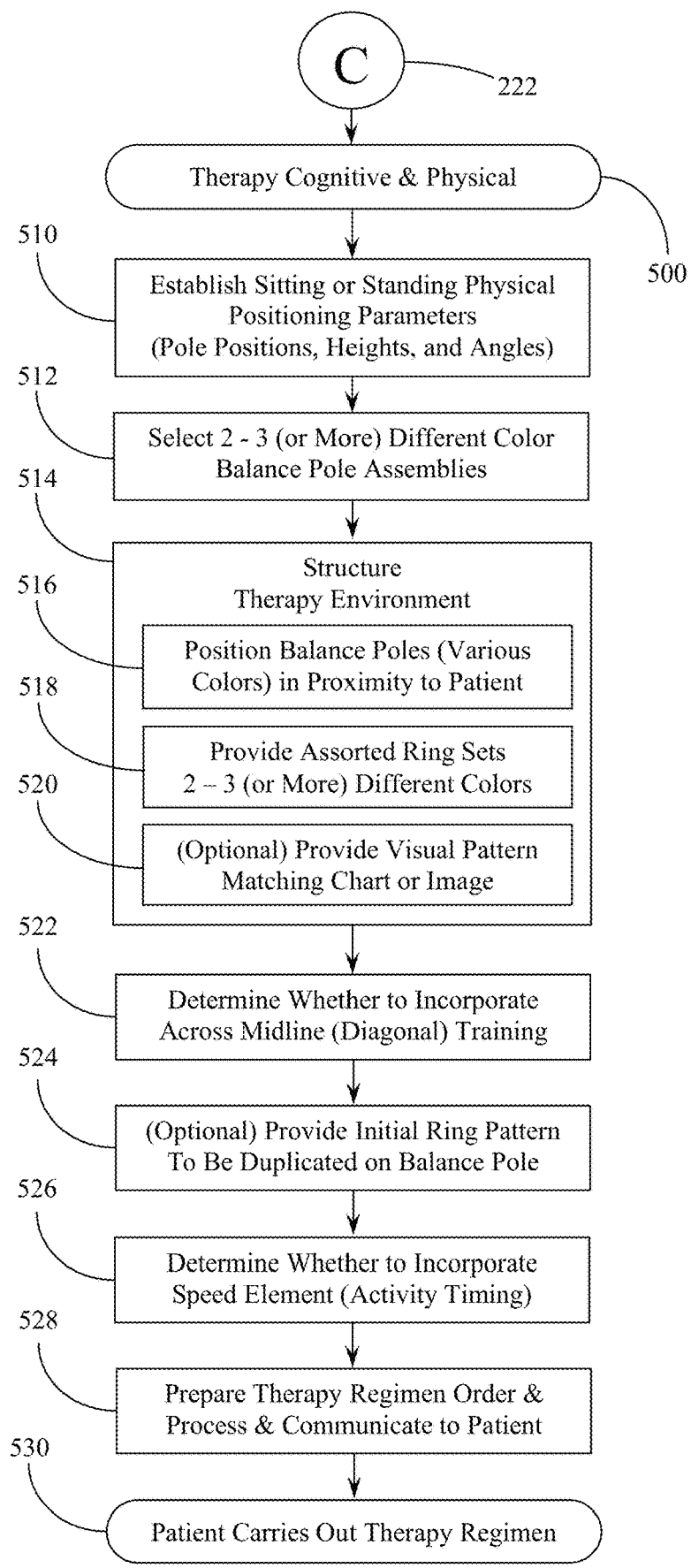
FIG. 10 is a flowchart showing the basic therapy process steps associated with a combined physical and cognitive therapy regimen carried out in a sitting or standing position utilizing the therapy tool sets of the present invention.

Reference is next made to FIG. 10 for a description of the process of implementing the system of the present invention in connection with a therapy session that it both cognitive and physical, with both aspects being significant for the rehabilitation. Therapy cognitive and physical routine is initiated at Step 500. At Step 510 the therapist establishes the sitting or standing, physical positioning parameters as described above. These include the balance pole assembly positions, heights, and angles. At Step 512 the therapist selects two or more different colored balance pole assemblies for use in the particular therapy session.

As before, the therapist structures the therapy environment at Step 514. This structuring of the environment includes positioning the balance poles (in various colors) in proximity to the therapy patient at Step 516. The therapist further provides various ring sets of two to three or more different colors introduced into the therapy environment at Step 518. Finally, the therapist may optionally provide visual pattern matching charts or images, or may provide pre-constructed patterns on balance pole assemblies for the therapy environment at Step 520.

As before, the therapist determines whether to incorporate across mid-line or diagonal training at Step 522. In this combined cognitive and physical therapy regimen, the therapist may optionally provide at Step 524 an initial ring pattern to be duplicated on a balance pole assembly by the therapy patient. This Step 524 pre-constructed pattern process is demonstrated in a general manner by the assemblies shown in FIG. 5B and described above. The therapist then determines at Step 526 whether to incorporate a speed element into the activity by timing the therapy patient through all or part of the process. At Step 528 the therapist prepares the overall therapy regimen order and process and communicates this to the therapy patient. The therapy patient carries out the cognitive and physical regimen at Step 530.

Figure 11:
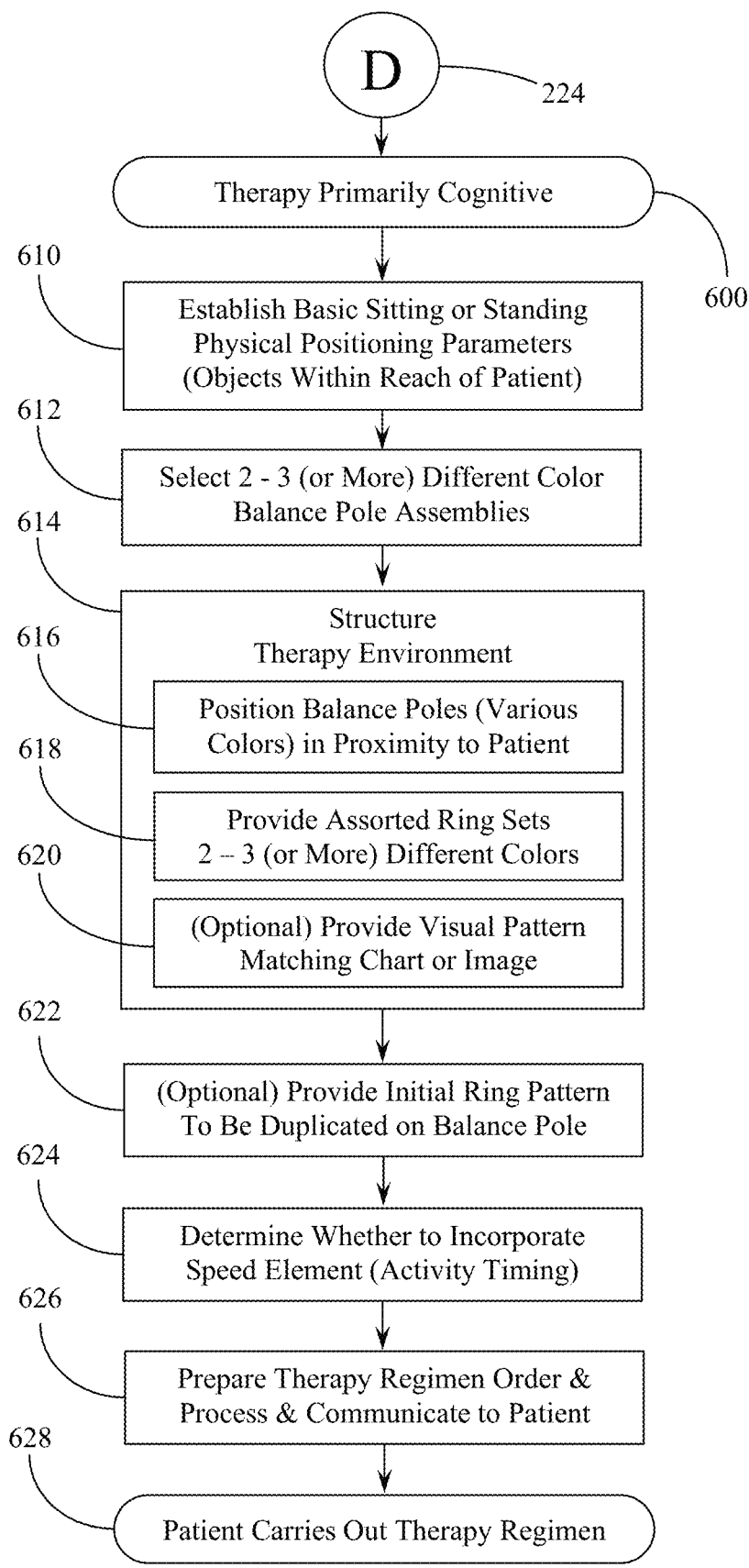
FIG. 11 is a flowchart showing the basic therapy process steps associated with a primarily cognitive therapy regimen carried out in a sitting or standing position utilizing the therapy tool sets of the present invention.

Reference is finally made to FIG. 11 for a description of the process of implementing a combination cognitive and physical therapy regimen that minimizes the physical component and focuses instead on the cognitive elements of therapy, in association with the systems of the present invention. The therapy primarily cognitive routine is initiated at Step 600. At Step 610 the therapist establishes the basic sitting or standing physical positioning parameters as before to generally place all objects involved in the therapy within reach of the therapy patient. Again, the emphasis in this routine is less on the physical range of motion and more on the therapy patient's recognition of colors, patterns, and hand-eye coordination. At Step 612 the therapist selects two to three or more, different colored balance pole assemblies for use in the therapy session.

Once again, at Step 614 the therapist structures the overall therapy environment utilizing the systems and components of the present invention. The balance poles in various colors are positioned in proximity to the therapy patient at Step 616. The therapist then provides assorted ring sets, preferably two to three rings sets or more, in different colors, to the therapy environment at Step 616. The therapist may provide a visual pattern matching chart or image that may simply be spoken to the therapy patient, or may be printed on paper or poster within view of the therapy patient. As described above, other methods for presenting a visual pattern to be matched are anticipated. One such option for providing a visual pattern is described at Step 622 in FIG. 11 where the therapist may provide an initial ring pattern structured on a first balance pole assembly (established by the therapist) to be duplicated on a second balance pole assembly by the therapy patient.

Once again, the therapist decides whether to provide a speed element at Step 624. This may involve an intermediate timing of a portion of the overall activity or timing of the completion of the overall activity by the therapy patient. The therapist prepares the therapy regimen order and process at Step 626 and communicates the same to the therapy patient. At Step 628 the therapy patient carries out the primarily cognitive therapy regimen.

Although the present invention has been described in connection with a number of preferred embodiments, for both the structures of the system and the steps in the methods, these embodiments are not considered to be limiting of the invention as further embodiments should be evident to those skilled in the art. These further embodiments still fall within the spirit and scope of the invention as set forth in the claims that follow. Where specific component sizes are mentioned in the above descriptions, these dimensions are representative of the spatial dimensions associated with the ranges of motion for the average person in a sitting or standing position. Although the preferred embodiments generally describe hollow tubular frame structures for the target poles and target bases, solid components are capable of carrying out the same or similar functions under the limitations of the claimed invention. The methods of use described in the preferred embodiments are intended to be representative of categories of rehabilitation regimens that might implement the systems of the present invention. As indicated, the therapy tool set of the present invention provides a versatile device that encourages the therapist to develop ever more innovative activities and exercises to provide physical and cognitive rehabilitation. The methods described and claimed herein therefore lend themselves to extension and refinement based upon the needs of a particular therapy patient and the rate of rehabilitation progress experienced.

We claim:

1. A portable and collapsible physical and occupational therapy system configured for easy assembly and disassembly so as to be compactly stored and transported, the therapy system comprising:

a target balance pole having an upper end and a lower end, the target balance pole comprising a plurality of interlocking pole sections, whereby an overall height of the target balance pole may be adjusted by varying the number of pole sections used;

a target base pivotally and removably supporting the lower end of the target balance pole, thereby positioning the target balance pole in an upright orientation, the upright orientation of the target balance pole pivotally variable from being orthogonal to the target base to being parallel with the target base, the target base comprising:

(a) a fixed perimeter frame component defining an outer edge of the target base;

(b) a fixed cross beam extending inward from the fixed perimeter frame; and (c) a target balance pole support positioned on the fixed cross beam and pivotally connecting the target balance pole to the target base, the target balance pole support comprising:

(i) an inverted tee connector having a pair of coaxial arms rotatable with respect to the fixed cross beam and a central post extending orthogonal to the pair of arms;

(ii) a coupling positioned on the central post for releasably receiving the lower end of the target balance pole; and (iii) at least one incremental rotation lock positioned at an interface between the coaxial pair of arms on the inverted tee connector and the fixed cross beam, whereby the target balance pole, once supported in position on the target base, may be releasably fixed at a plurality of incremental rotation angles including: orthogonal to a plane of the target base (an upright position); parallel with a plane of the target base (a fully collapsed position); and at least one incremental angle between the upright and the fully collapsed position; and a plurality of manipulable objects sized and shaped to engage the upper end of the target balance pole;

whereby therapy patients may exercise a range of motions and cognitive actions by placing one or more of the plurality of manipulable objects onto the target balance pole.

2. The system of claim 1 wherein the fixed perimeter frame comprises a rectangular frame with corners and sides and wherein the fixed cross beam extends between two opposing sides of the fixed perimeter frame.

3. The system of claim 1 wherein the fixed perimeter frame comprises a circular frame having a diameter and the fixed cross beam extends across the diameter of the fixed perimeter frame.

4. The system of claim 1 wherein the fixed perimeter frame comprises a pair of curved arms each with a center attachment end and a perimeter terminal end and the fixed cross beam extends between the two center attachment ends.

5. The system of claim 1 wherein the target balance pole comprises a cylindrical pole having a length and an outer diameter, and the plurality of manipulable objects comprises circular rings having an inside diameter, the outer diameter of the target balance pole being incrementally smaller than the inside diameter of the circular rings, whereby the circular rings may be placed over the upper end of the target balance pole and slide down the length of the target balance pole towards the lower end of the pole.

6. The system of claim 1 wherein the plurality of manipulable objects comprises multiple groups of manipulable objects, each group comprising a color distinct from every other group.

* * * * *